United States Patent [19]

Metroka et al.

[11] Patent Number: 4,845,772
[45] Date of Patent: Jul. 4, 1989

[54] PORTABLE RADIOTELEPHONE WITH CONTROL SWITCH DISABLING

[75] Inventors: Michael P. Metroka, Algonquin; Scott B. Davis, Buffalo Grove; P. J. Gargulak, Prairie View, all of Ill.

[73] Assignee: Motorola, Inc., Schaumburg, Ill.

[21] Appl. No.: 206,072

[22] Filed: Jun. 13, 1988

[51] Int. Cl.⁴ ............................................. H01Q 7/04
[52] U.S. Cl. .................................. 379/61; 379/433; 455/90
[58] Field of Search .................. 379/433, 442, 61, 63, 379/58; 455/90

[56] References Cited

U.S. PATENT DOCUMENTS

| | | |
|---|---|---|
| 3,551,607 | 12/1970 | Battista et al. ................... 379/433 |
| 3,705,959 | 12/1972 | Swanson . |
| 3,852,541 | 12/1974 | Altenberger . |
| 3,896,270 | 7/1975 | Kopec et al. . |
| 4,018,998 | 4/1977 | Wegner . |
| 4,471,493 | 9/1984 | Schober . |

OTHER PUBLICATIONS

Realistic Owner's Manual: Duofone ET-415 Cordless Electronic Telephone; Cat. No. 43-555; 1984.
Panasonic KX-T3000 Easa-Phone Cordlessphone FCC Transmitter Type Acceptance Filing-Exhibits D, E, F, and H of Type Acceptance No. ACJ96NKX-T3000.

Primary Examiner—Robert Lev
Attorney, Agent, or Firm—Raymond A. Jenski; Rolland R. Hackbart

[57] ABSTRACT

A portable radiotelephone with control switch disabling is disclosed. A flip element which contains a microphone and covers a keypad and other control buttons when in a closed position also activates a hookswitch. When the hookswitch and microprocessor indicate that the flip element is in a closed position, the on/off switch cannot be activated to turn the portable radiotelephone on or off and switches which control volume level are deactivated.

19 Claims, 7 Drawing Sheets

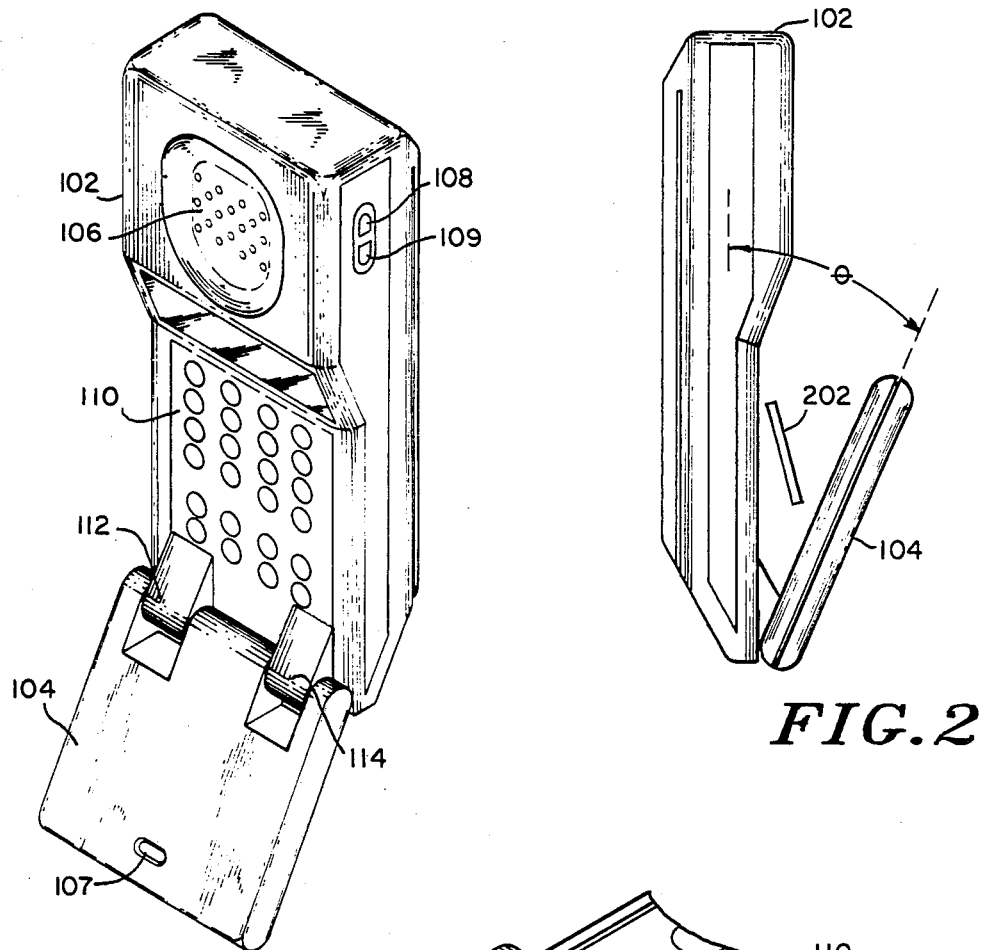
FIG. 1
FIG. 2
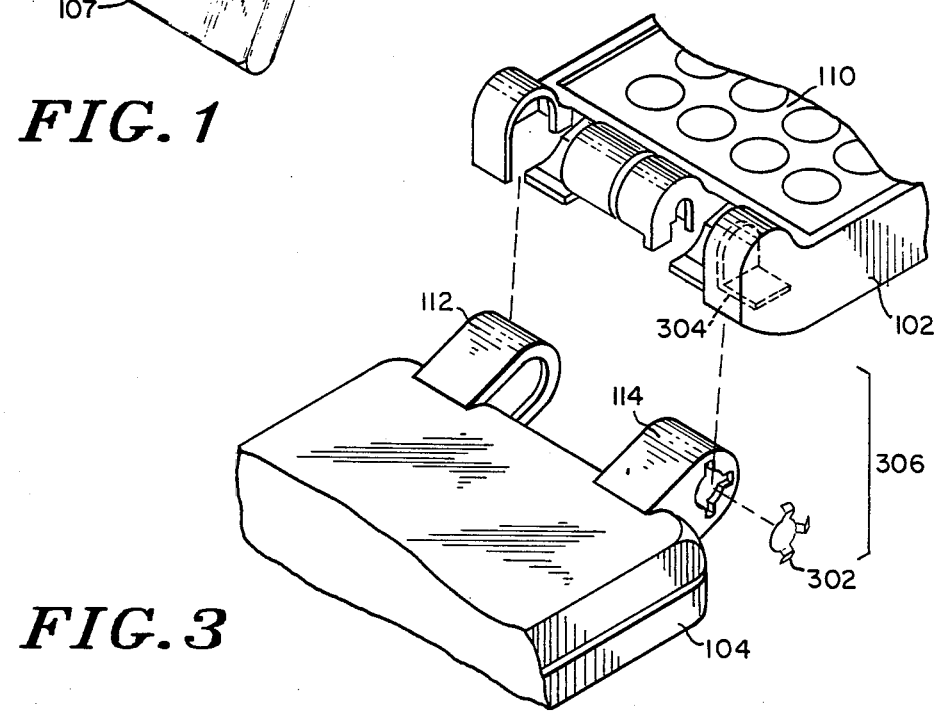
FIG. 3

PORTABLE RADIOTELEPHONE WITH CONTROL SWITCH DISABLING

BACKGROUND OF THE INVENTION

This invention relates generally to portable telephone apparatus and more particularly to portable radiotelephones which utilize switches or similar elements for control functions and a keypad for dialing telephone numbers.

Telephones having a rotary or pushbutton dial mechanism and other buttons integral to the handset portion have become commonplace in landline subscriber stations. This arrangement offers the telephone user the convenience of bringing the user interface mechanism and control buttons close to the user.

Radiotelephone operation, such as that offered in cellular radiotelephone or in cordless telephone sets, provide a mobility to the telephone user which landline telephone does not provide. The lack of a cord and the small size of the portable radiotelephone unit enables the user to carry the unit essentially wherever the user goes. This portability, however, allows the portable unit to be placed in locations where foreign objects may come in contact with the user interface mechanism and activate number or control buttons. Some protection may be offered by a device which covers the user interface mechanism and control buttons when not in use but small objects such as coins, paperclips, etc. may be trapped between the cover and the mechanism. Undesired operation of buttons in a radiotelephone setting may turn the equipment on or off, cause transmission of unwanted signals and prevent use of a radio channel, or cause undesired functions to occur. Such undesired activation of buttons is likely to engage functions which reduce the operating life of the battery which powers the portable unit.

Some cordless telephones have been offered in the United States which disable the dialling, number memory, and call processing functions when a cover is closed over the dialling keypad. One such cordless telephone is manufactured by the Panasonic Company as model number KXT3000. While offering protection against false telephone number and call processing, the on-off switch and volume control remain subject to undesired activation. Although it might appear that simply turning the unit on or off when the cover is closed would solve all unwanted operation, an operational state is necessary in which the unit is capable of receiving a call and alerting the user but not of taking any other unwanted actions. Such a call receiving state should be enabled by the user and not be subject to accidental deactivation by an unwanted switching off of the unit. Furthermore, if the unit has purposefully been switched off by the user, it should not be unusually subject to being accidentally switched on.

SUMMARY OF THE INVENTION

It is, therefore, one object of the present invention to prevent unwanted operation of dial and control button mechanisms by foreign objects which may be trapped between the mechanisms and a cover.

It is another object of the present invention to disable the power on-off button when the cover is closed to prevent such unwanted operation.

It is a further object of the present invention to deactivate the volume control when the cover is closed.

Accordingly, these and other objects are realized in the present invention which encompasses a portable radiotelephone having a keypad covered by a movable element which produces an on-hook condition when the movable element is in a first position covering the keypad and which produces an off-hook condition when the movable element is in a second position exposing the keypad. When an on-hook condition is produced, a switchable power source is prevented from being switched on or off.

BRIEF DESCRIPTION OF THE DRAWINGS

FIG. 1 is an isometric drawing of a portable radiotelephone which may employ the present invention.

FIG. 2 is a side view of the portable radiotelephone of FIG. 1 in which a foreign object may be trapped between the flip cover element and the user interface.

FIG. 3 is a diagram of the hookswitch switch mechanism which may be employed in the radiotelephone of FIG. 1.

DESCRIPTION OF THE PREFERRED EMBODIMENT

Figure 4:
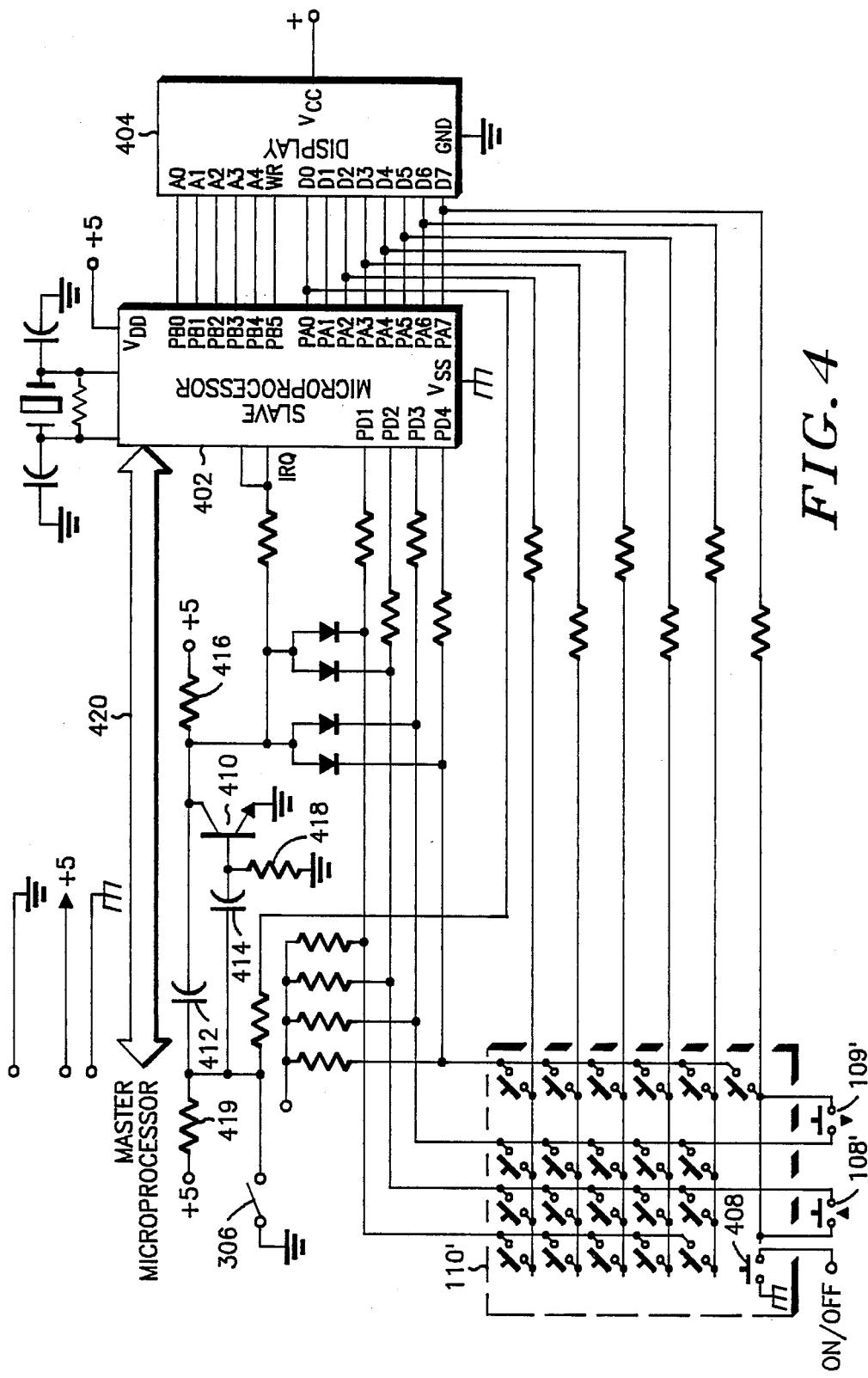
FIG. 4 is a schematic diagram of the slave microcomputer which may employ the present invention.

A portable radiotelephone adapted to be used in a cellular radiotelephone system is shown in FIG. 1. This portable unit consists of two readily apparent portions, a body portion 102 and a flip element portion 104. The drawing of FIG. 1 shows the flip element 104 in an "open" position such that a user of the portable unit may listen via earpiece 106 and may speak into microphone 107. The dial or keypad 110 consists of a plurality of buttons numbered one through zero, # and *, familiar telephone arrangement as well as additional function buttons such as "send", "end", "on-off", and other buttons associated with memory recall. Disposed on the side of the body portion 102 are two volume control buttons: volume increase 108 and volume decrease 109, which may adjust the volume of the earpiece and/or the ringer.

When the flip element 104 is open as shown in FIG. 1, the portable cellular telephone can be in the state of answering or making a telephone call. Such a state is commonly known as "off-hook". (It should be noted that in the cellular system an additional operator activity is required to place a call: upon entering a telephone number to be dialed, the send button must be depressed in order to activate the portable unit's transmitter and to complete the call. In the preferred embodiment, the send button may also be used to answer a call if the flip element is already open). Upon completion of the telephone call, the user may hang up the portable telephone (go "on-hook") by moving the flip element 104 into a stowed position, that is, rotated about the axis of hinges 112 and 114 so that the flip element 104 rests nearly against keypad 110. This action activates a hookswitch (HKS) which causes the telephone call to be terminated. Depression of the end button without closing the flip element may also terminate the call.

Activation of the hookswitch occurs in the preferred embodiment when the angle between the body 102 and the flip element 104 equals approximately 45°. The closing of the flip element 104 can best be perceived in FIG. 2. It can be imagined that should a foreign object 202 become lodged between the flip element 104 and the body 102, undesired key depressions of keypad 110 might occur.

The hookswitch in the preferred embodiment is located between the flip element 104 and the body portion 102 and may be seen in the detail of FIG. 3. A contact 302 consisting of a conventional conductive spring material is disposed in hinge 114 of flip element 104 and rotates with the flip element 104. A printed circuit board element 304 is disposed in the body portion 102 in a position such that the contact 302 presses against the circuit board element 304. Metalization disposed on printed circuit board element 304 is positioned such that when the flip element 104 is opened to an angle of 45°, an electrical connection is completed between the metalization through the contact 302 to ground. The combination of the contact 302 and the printed circuit board element 304 is the hookswitch (HKS) 306.

In the preferred embodiment, two interconnected microcomputer systems are utilized to control the basic functions of the portable unit (the master microcomputer) and to control the key pad and display functions (the slave microcomputer). The slave microcomputer is shown in the schematic of FIG. 4. The slave microcomputer system consists of a microprocessor 402 which, in the preferred embodiment, is an MC68HC05C4 microprocessor (which also has on-board memory). The basic function of the slave microprocessor is to provide interface to the user of the portable radiotelepone via keyboard, display, and other buttons and indicators. The slave microprocessor is coupled to a multi-segment display 404 which, in the preferred embodiment, is a conventional LED eight digit display. The slave microprocessor 402 is also coupled to a keypad matrix of buttons 110' which enables the portable radiotelephone user to input (dial) telephone numbers, store and recall telephone number information, and perform other radiotelephone functions (such as initiating a telephone call). In the preferred embodiment, one of the keys 408 of the matrix 110' is specially dedicated to the function of turning the power on and off. Power on/off is accomplished by a momentary switch closure (by key 408) to ground which activates on/off circuitry. Volume increase switch 108' and volume decrease switch 109' are electrically coupled to the slave microprocessor 402 as part of the row/column matrix. Their physical location is away from the keypad 110' to allow for greater user convenience.

The function which is normally performed by a hookswitch in a conventional landline telephone is performed in the portable radiotelephone of the present invention as previously described in relation to FIG. 3. The hookswitch is shown schematically as switch 306 in FIG. 4. A DC (Direct Current) circuit is made or broken by HKS 306 to ground and applied to microprocessor 402. Furthermore, a pulse is generated from any change of state of the HKS 306 by a transistor 410 capacitors 412 and 414 and resistors 416, 418, and 419. The output of transistor 410 is taken from the collector and applied to the interrupt request (IRQ) input and the keypad column inputs of microprocessor 402 having a negative duration of approximately 10 microseconds. Microprocessor 402 stores the status of HKS 306 and provides an indication of the change of state of HKS 306 to the master microprocessor.

Figure 5:
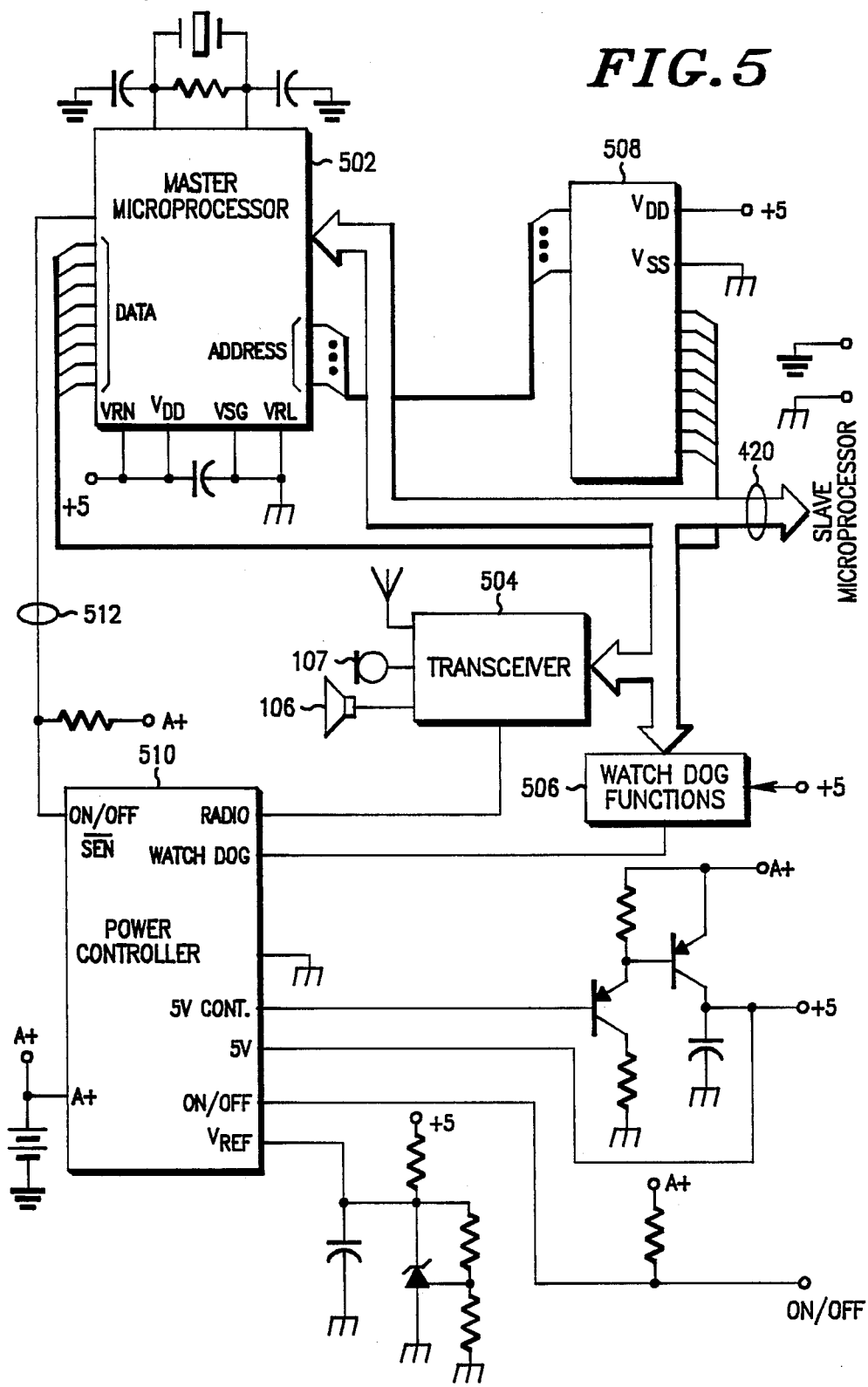
FIG. 5 is a schematic diagram of the master microcomputer which may employ the present invention.

Communication between the slave microprocessor 402 and the master microprocessor is maintained on a data bus 420. This data bus 420 is coupled to the master microprocessor 502 as shown in FIG. 5 of the master microcomputer. Other functions also share the data bus 420: the portable radiotelephone transceiver 504 accepts radio channel synthesizer information and message encoding/decoding from the bus 420, and specialized watchdog functions 506 operate from instructions given on bus 420. In the preferred embodiment, master microprocessor is realized by a conventional 68HCll microprocessor. The remainder of the microcomputer associated with microprocessor 502 consists of memory 508, which in the preferred embodiment may be a plurality of conventional EPROMs and EEPROMs, and a specialized power controller 510 which performs the functions of turning on and off the several different voltages required by the different portable transceiver functions, as well as conditioning the on/off signal. In order to aid in the understanding of the operation of the present invention, peripheral power switching circuits such as external power sensing and memory keep-alive are omitted from FIG. 5 and the descriptive text.

Assuming that the portable radiotelephone has been powered-up and the flip element has been opened to enable the HKS, a keypad 110 pushbutton activation by the portable radiotelepone user results in a communication between the slave microprocessor 402 and the master microprocessor 502 via the bus 420. The slave microprocessor 402, in the preferred embodiment, communicates that a closure has occurred between a particular row and a particular column corresponding to the key pressed by the user. The master microprocessor 502 may then take the appropriate action, such as returning a digit instruction via bus 420 for the slave microprocessor 402 to cause the display 404 to illuminate or otherwise display. Thus, the slave microprocessor 402 is commanded by the master microprocessor 502 or the user in order to complete an assignment.

Figure 6:
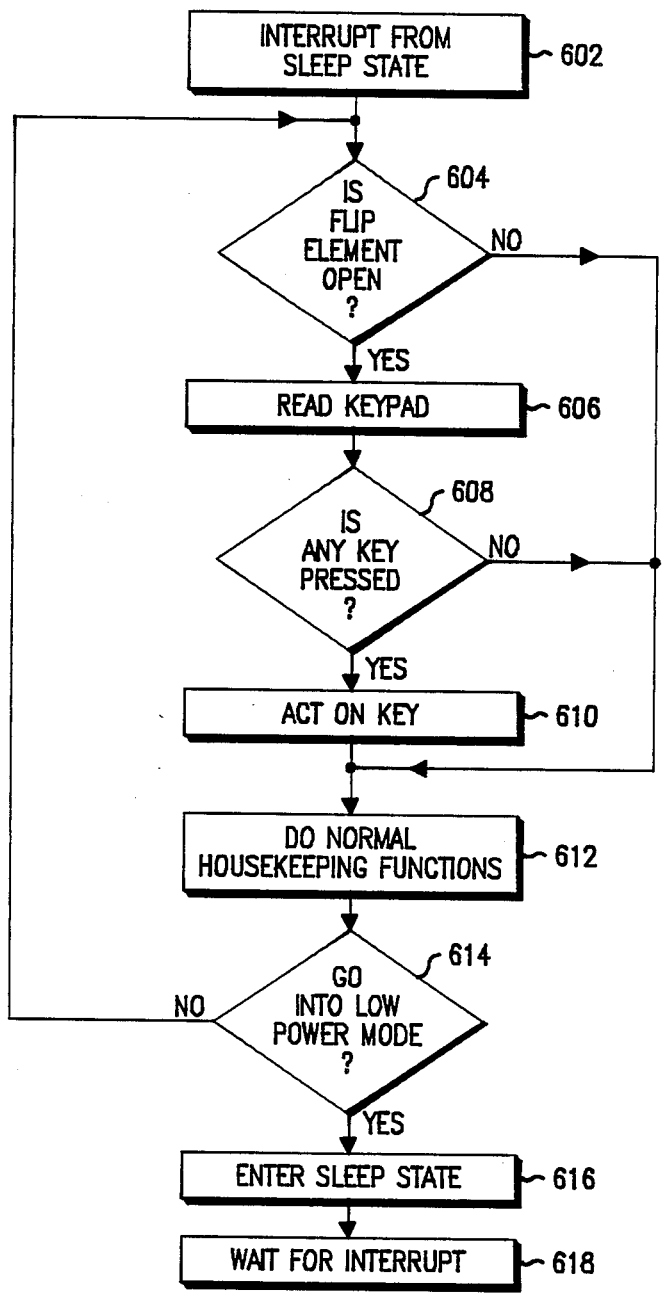
FIG. 6 is a flowchart of the deactivation process which may be employed in the present invention.

When both the slave microprocessor 402 and the master microprocessor 502 operate together, the process shown in FIG. 6 is that which is followed to determine if the keypad keys and control switches should cause a response by the portable rdiotelephone. Since it is an important feature of the present invention to disable the user interface when the flip element is closed, this feature is incorporated into the process of FIG. 6. Although the preferred embodiment has been implemented employing two microprocessors, this should not be a limitation of the invention for it is possible to implement the present invention in a single microprocessor should the designer so desire. For either a single microprocessor or a multiple microprocessor system, the microprocessors may be interrupt driven in order to save battery power. The process of FIG. 6, therefore, commences with an interrupt due to a change of state of the hookswitch 306 or a key closure from keypad 110 to enable the microcomputer system at 602. A determination is made, at 604, whether the flip element is open or closed. If the flip element is open, then the keypad 110 is read to determine which key has been closed at 606. If a key has been depressed at 608, then the function or character designated by the key is acted upon at 610. If a keypad 110 key has not been depressed, then no action is taken and the microcomputer system resumes its normal functions of controlling the transceiver, the display, and other housekeeping chores as shown at 612. If it is determined that the flip element is not open (at 604), then any keypad key depression is considered to be spurious and is ignored by progressing directly from the determination block at 604 to the normal housekeeping functions block at 612. The entire process is repeated for a predetermined period of time until a determination is made at the microcomputer system should go into a low power consumption mode as determined at 614. The microcomputer system is put into a "sleep" state at 616 and only the low power functions await for an interrupt signal at 618.

Figure 7:
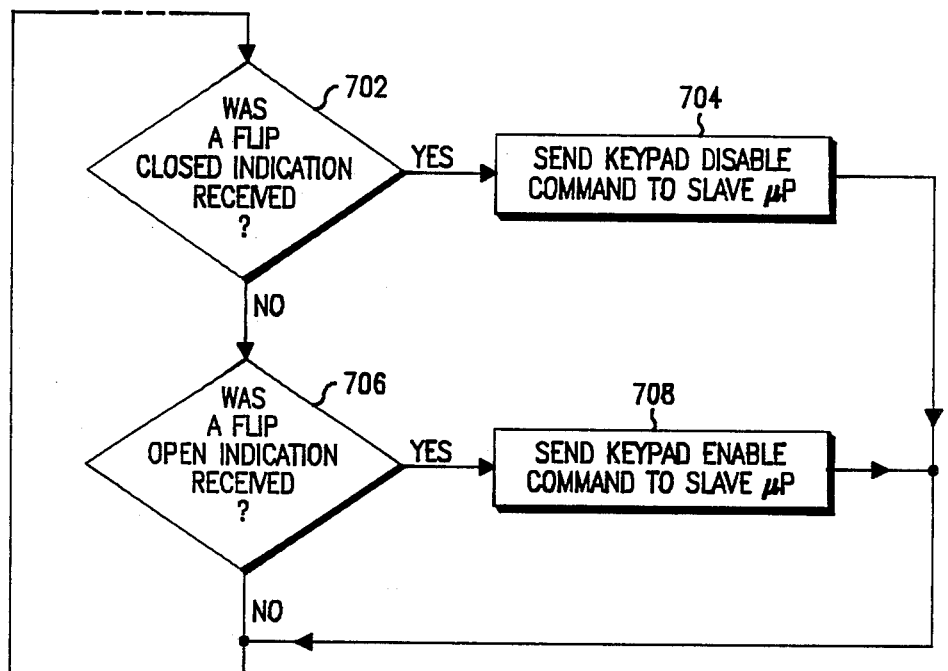
FIG. 7 is a flowchart of the master microcomputer process of deactivation employed in the present invention.

If the microcomputer system is implemented as a master and a slave microcomputer, the master microprocessor utilizes the process shown in FIG. 7 (as part of its standard operating procedure) to prevent spurious key depressions from activating the portable transceiver. Since the slave microprocessor 402 can send either a flip element closed indication or a flip open indication, a detection of those indications is necessary by the master microcomputer. A test is made, at 702, of whether a flip element closed indication has been received from the slave microprocessor 402 on the bus 420. If a flip element closed indication is received, then the master microprocesor 502 sends a keypad disable command, at 704, to the slave microprocessor 402 on the bus 420. The master microcomputer then returns to its programmed routine of chores. If a flip element closed indication is not received, at 702, then a test is made of whether a flip element open indication has been received from the slave microprocessor 402, at 706. If such an indication has been received by the master microprocessor 502, then a command is sent to the slave microprocessor 402 on the bus 420 to enable the slave microprocessor 402 to again read any keypad button depressions and to send such information to the master microprocessor 502. Upon completion of the enable command, the master microprocessor 502 returns to its routine chores.

Figure 8A:
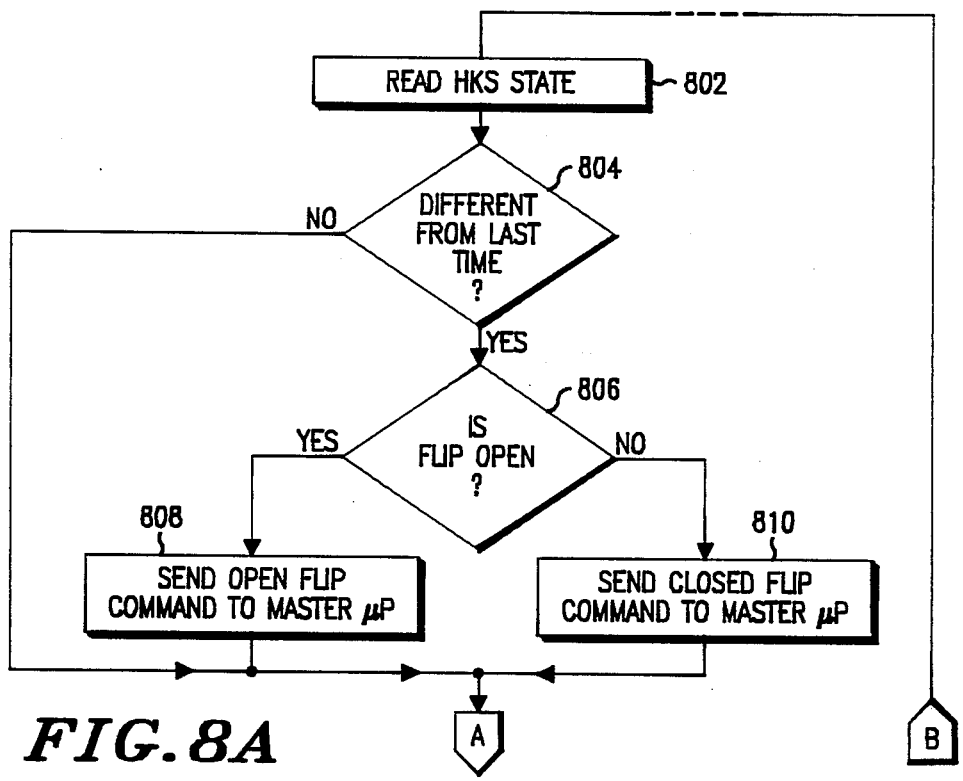
FIGS. 8A and 8B, combined, are a flowchart of the slave microcomputer process of deactivation employed in the present invention.
Figure 8B:
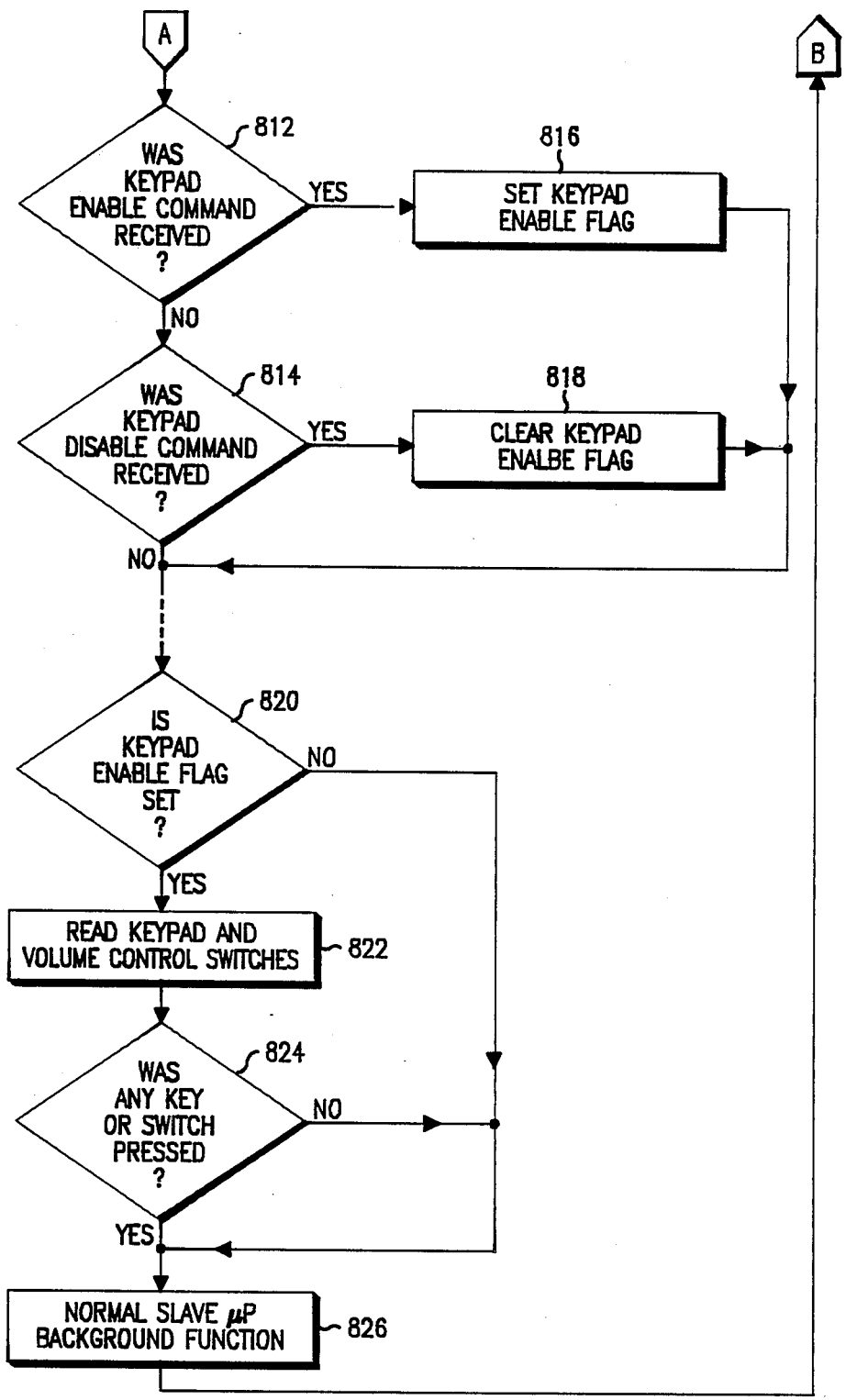

The process followed by the slave microcomputer in realizing the present invention in the preferred embodiment is shown in FIGS. 8A and 8B. The slave microprocessor 402 memorizes the state of the hookswitch 306 corresponding to whether the flip element is open or closed. The slave microprocessor 402 determines, as part of its routine of chores, whether the hookswitch 306 has changed state by comparing the current state against the stored state at 802 and 804. If the state is different, then a determination is made, at 806, whether the flip element is open or closed. If the flip element is determined to be open, then an open flip element command is transmitted to the master microprocessor at 808. If the determination at 806 yields a closed flip element, then a closed flip element command is conveyed to the master microprocessor at 810. In either case the master microprocessor 502 always maintains the flip element state in its associated storage. The slave microprocessor, as part of its routine of chores, checks for a keypad enable or a keypad disable command received from the master microprocessor 502. This determination is made at decision blocks 812 and 814. A keypad enable command sets a keypad enable flag in microprocessor 402 memory at 816, while a keypad disable command clears the keypad enable flag at 818 before the process of FIG. 8 resumes its normal background flow. Further along the normal background process, the slave microprocessor 402 reads the keypad enable flag, at 820, and reads the row and column lines from the keypad in addition to the volume increase switch 108 and the volume decrease switch 109, at 822, to determine if any key or switch has been depressed (such determination made at 824). If a key or switch has been depressed, then an identification of the key or switch depression is sent to the master microprocessor at 826. The process of FIG. 8 then returns to the normal slave microprocessor background functions. Thus, if the flip element is determined to be open, then the keys of the keypad and the volume increase and decrease switches are read in conventional fashion. If the flip element is determined to be closed, then the keys of the keypad and the volume increase and decrease switches are ignored. There is, however, one further exception.

The on/off key is also covered and protected by the flip element. In the preferred embodiment, the on/off key is placed among the matrix of keypad keys for aesthetic reasons. It is a desirable feature that once the power is turned on, the portable transceiver remain in a power-on mode and not be turned off due to a spurious on/off key depression when the flip element is closed. Likewise, when the portable transceiver is turned off, it is equally desirable that the portable transceiver remain in the power-off condition even though a spurious on/off key depression may occur when the flip element is closed. Two processes enable this operation.

Figure 9:
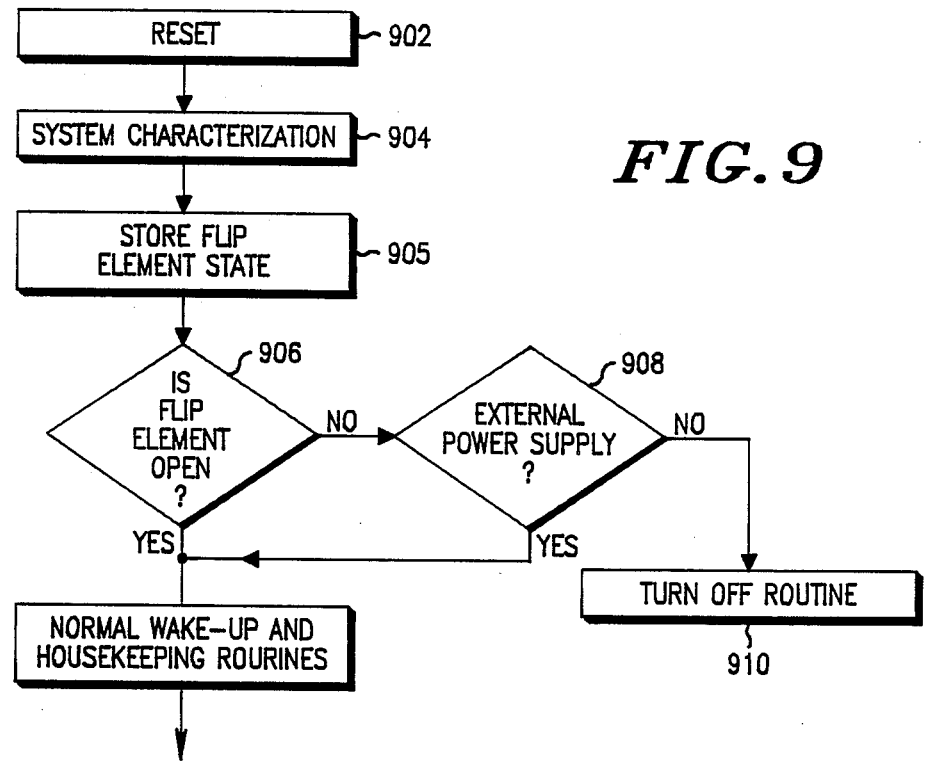
FIG. 9 is a flowchart of the master microcomputer process of activation/deactivation of the power switch upon initial power-up of the master microcomputer as employed in the present invention.

Depressions of the on/off key are ignored when the flip element is closed. Referring again to FIG. 4, when a momentary depression of the on/off switch 408 occurs, a ground is applied to the on/off line and to the power controller 510 of FIG. 5. The ground, applied through switch 408, is buffered by power controller 510 and applied to the master microprocessor 502 via line 512. Upon receipt of this buffered on/off signal on line 512, the master microprocessor 502 follows the process flowcharted in FIG. 9. The master microprocessor 502 and the rest of the associated microcomputer system undergoes a reset operation at 902 and requests a system characterization (a definition of what peripherals exist on the bus) at 904. As part of the characterization process, the slave microprocessor 402 reports the state of the flip element. The current flip element state is then stored, at 905. The master microprocessor then determines if the flip element is open, at 906. If this determination is positive, then the master microcomputer proceeds with its normal wake-up and housekeeping routines. If the flip element is determined to be closed at 906, then a check is made to determine if an external supply has been connected to the portable radiotelephone (at 908). Such a circuitry sharing arrangement is further described in U.S. patent application No. 107,227, "Radio Arrangement Having Two Radios Sharing Circuitry", filed on behalf of Michael P. Metroka on Oct. 9, 1987. If an external supply is determined to exist at 908, then the master microprocessor 502 returns to its normal housekeeping routines. If an external supply is not connected, then a power turn off routine is followed at 910. (Power turn off is accomplished by the master microprocessosr 502 by storing its status and other essential parameters in memory before allowing the watchdog functions 506 of FIG. 5 to runout. A watchdog power function runout is communicated to the power controller 510 which subsequently turns off the portable radiotelephone).

Figure 10:
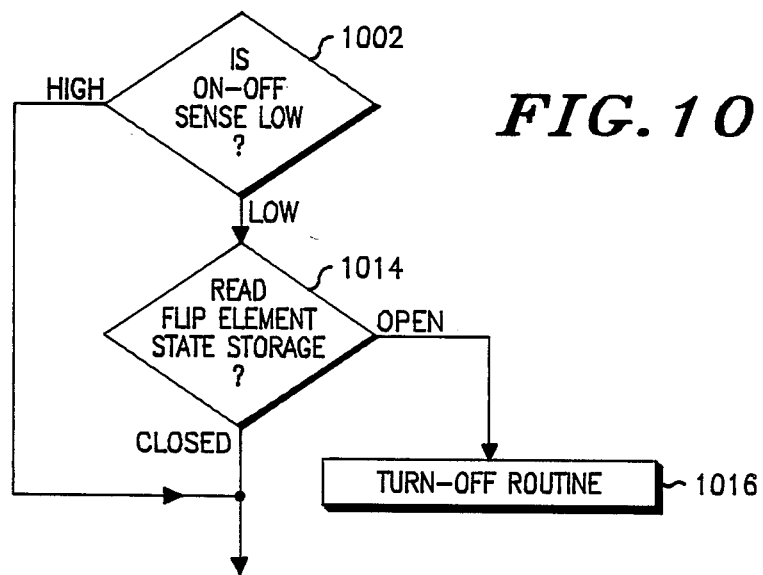
FIG. 10 is a flowchart of the activation/deactivation of the power switch after initial power-up of the master microcomputer as employed in the present invention.

Once the master microcomputer has successfully powered up, any on/off switch depressions are ignored so long as the flip element is closed (as shown in the process of FIG. 10). A determination of the signal sense on line 512 of FIG. 5 is made by the master microprocessor 502 at 1002. If the sense is a signal high, then the master microprocessor continues with its background routines. If the sense is low, then The master microprocessor 502 reads the status of the flip element storage (at 1014) and either proceeds with a turn off routine (at 1016) if the flip element is open, or ignores a depression of the on/off switch as a spurious depression if the flip element is closed. Thus, a valid on/off command may be processed only if the flip element is open.

In summary, then, a portable radiotelephone having the capability of ignoring spurious control switch inputs has been shown and described. A flip element which covers a keypad and other control buttons when in a closed position also activates a hookswitch. When the hookswitch and microprocessor indicate that the flip element is in a closed position, the on/off switch cannot be activated to turn the portable radiotelephone on or off. Also, switches which control volume level are deactivated when the flip element is in the closed position. While a particular embodiment of the invention has been shown and described, it is to be understood that the invention is not to be taken as limited to the specific embodiment herein, and that changes and modifications may be made without departing from the true spirit of the invention. It is contemplated therefore to cover the present invention, and any and all such changes and modifications, by the appended claims.

We claim:

1. A portable radiotelephone apparatus having a keypad disposed on an outer surface and a movable element covering the keypad when placed in a first position and exposing the keypad when placed in a second position, the portable radiotelephone apparatus operating from a switchable power source and comprising:
    means for producing an on-hook condition in the portable radiotelephone apparatus if the movable element is in the first position and for producing an off-hook condition in the portable radiotelephone if the movable element is in the second position; and
    means for preventing the switchable power source from being switched on or off if the portable radiotelephone apparatus is in said produced on-hook condition.

2. A portable radiotelephone apparatus in accordance with claim 1 wherein the movable element further comprises a telephone microphone.

3. A portable radiotelephone apparatus in accordance with claim 1 wherein said means for producing an on-hook and an off-hook condition in the portable radiotelephone apparatus further comprises an electrical hookswitch coupled to a microprocessor.

4. A portable radiotelephone apparatus in accordance with claim 1 wherein said means for preventing further comprises means for enabling the switchable power source to be turned on if the portable radiotelephone apparatus is in said off-hook condition 5. A portable radiotelephone apparatus in accordance with claim 4 wherein said means for enabling further comprises a microprocessor.

6. A portable radiotelephone apparatus in accordance with claim 4 wherein said means for enabling further comprising means for setting an off-hook memory element to indicate said off-hook condition after said switchable power source has been switched on.

7. A portable radiotelephone apparatus in accordance with claim 6 wherein said means for preventing further comprises means for comparing said off-hook memory element indication to an indication from said means for producing to determine if the portable radiotelephone apparatus is on-hook.

8. A portable radiotelephone apparatus in accordance with claim 1 wherein said means for preventing further comprises means for enabling the switchable power source to be switched off if the portable radiotelephone apparatus is in said produced off-hook condition.

9. A portable radiotelephone apparatus in accordance with claim 1 further comprising means for preventing the adjustment of the acoustic volume of an acoustic transducer when the portable radiotelephone apparatus is in said produced on-hook condition.

10. A portable radiotelephone apparatus having a keypad disposed on an outer surface and a movable element covering the keypad when placed in a first position and exposing the keypad when placed in a second position, the portable radiotelephone apparatus operating from a switchable power source and comprising:
    means for producing an on-hook condition in the portable radiotelephone apparatus if the movable element is in the first position and for producing an off-hook condition in the portable radiotelephone if the movable element is in the second position; and
    means for preventing adjustment of the acoustic volume of an acoustic transducer if the portable radiotelephone apparatus is in said produced on-hook condition.

11. A portable radiotelephone apparatus in accordance with claim 10 wherein the movable element further comprises a telephone microphone.

12. A portable radiotelephone apparatus in accordance with claim 10 wherein said means for producing an on-hook and off-hook condition in the portable radiotelephone apparatus further comprises an electrical hookswitch coupled to a microprocessor.

13. A portable radiotelephone apparatus in accordance with claim 10 wherein said means for preventing further comprises means for enabling the means for adjusting the acoustic volume of said acoustic transducer if the portable radiotelephone apparatus is in said produced off-hook condition.

14. A method of preventing spurious switch operation in a portable radiotelephone operating from a switchable power source and having a keypad disposed on the outer surface and a movable element covering the keypad when placed in a first position and exposing the keypad when placed in a second position, the method comprising the steps of:
    producing an on-hook condition in the portable radiotelephone apparatus when the movable element is in the first position and producing an off-hook condition in the portable radiotelephone in when the movable element is in the second position; and preventing the switchable power source from being switched on or off when the portable radiotelephone is in said produced on-hook condition.

15. A method in accordance with the method of claim 14 wherein said preventing step further comprises the step of enabling the switchable power source to be switched on when the portable radiotelephone apparatus is in said produced off-hook position.

16. A method in accordance with the method of claim 15 wherein said enabling step further comprises the step of setting an off-hook memory element to indicate said off-hook condition after said switchable power source has been switched on.

17. A method in accordance with the method of claim 16 wherein said preventing step further comprises the step of comparing said off-hook memory element indication to an indication from said means for producing to determine if the portable radiotelephone apparatus is in said on-hook condition.

18. A method in accordance with the method of claim 14 wherein said preventing step further comprises the step of enabling the switchable power source to be switched off when the portable radiotelephone is in said off-hook condition.

19. A method in accordance with the method of claim 14 further comprising the step of preventing the adjustment of the acoustic volume of an acoustic transducer when the portable radiotelephone apparatus is in said on-hook condition.

* * * * *